United States Patent
Hara

(10) Patent No.: US 7,208,941 B2
(45) Date of Patent: Apr. 24, 2007

(54) TWO-WIRE TYPE CURRENT OUTPUT SENSOR AND IC THEREFOR

(75) Inventor: Takashi Hara, Ichinomiya (JP)

(73) Assignee: Aisin Seiki Kabushiki Kaisha, Aichi, Perf. (JP)

( * ) Notice: Subject to any disclaimer, the term of this patent is extended or adjusted under 35 U.S.C. 154(b) by 183 days.

(21) Appl. No.: 10/976,898

(22) Filed: Nov. 1, 2004

(65) Prior Publication Data

US 2006/0091879 A1    May 4, 2006

(30) Foreign Application Priority Data

Oct. 31, 2003    (JP) ............................. 2003-371827

(51) Int. Cl.
*G01B 7/30* (2006.01)
*G01P 3/48* (2006.01)

(52) U.S. Cl. .................................. 324/207.25; 324/173

(58) Field of Classification Search ........... 324/207.25, 324/173
See application file for complete search history.

(56) References Cited

U.S. PATENT DOCUMENTS

| | | | |
|---|---|---|---|
| 3,761,751 A |   | 9/1973 | Fink et al. |
| 3,819,951 A |   | 6/1974 | Moore |
| 5,486,759 A | * | 1/1996 | Seiler et al. ............. 324/207.2 |
| 5,880,586 A | * | 3/1999 | Dukart et al. ............ 324/207.2 |
| 6,137,271 A |   | 10/2000 | Yang |

FOREIGN PATENT DOCUMENTS

| | | |
|---|---|---|
| DE | 34 08 657 A1 | 9/1985 |
| DE | 36 18 500 A1 | 12/1987 |
| DE | 39 34 504 A1 | 4/1991 |
| DE | 195 32 328 A1 | 3/1997 |
| DE | 199 37 155 A1 | 3/2001 |
| DE | 101 50 760 A1 | 8/2002 |
| EP | 0 743 526 A1 | 11/1996 |
| EP | 0 838 684 A1 | 4/1998 |
| JP | 10 332 725 A1 | 12/1998 |
| WO | WO 03/087845 A2 | 10/2003 |

* cited by examiner

*Primary Examiner*—Edward Lefkowitz
*Assistant Examiner*—David M. Schindler
(74) *Attorney, Agent, or Firm*—Sughrue Mion, PLLC

(57) ABSTRACT

A two-wire type current output sensor includes two external connection terminals to one of which a power supply flows from an outside and from the other one of which the power supply flows to the outside, a detecting element capable of outputting a detection signal, a signal processing circuit for changing a current supplied to a power supply side of the signal processing circuit based on the detection signal of the detecting element and outputting the changed current, and a connection switching circuit for switching a connection between the two external connection terminals and the signal processing circuit such that one of the external connection terminals at a higher voltage is connected to the power supply side of the signal processing circuit while the other one of the external connection terminals at a lower voltage is connected to an output side of the signal processing circuit.

10 Claims, 5 Drawing Sheets

FIG. 7    Known work
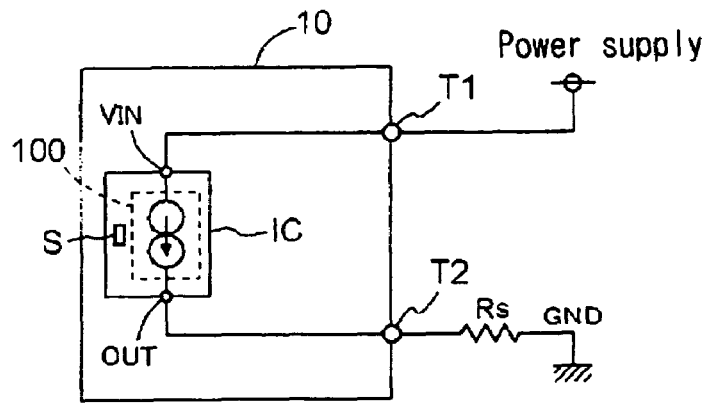
FIG. 8    Known work
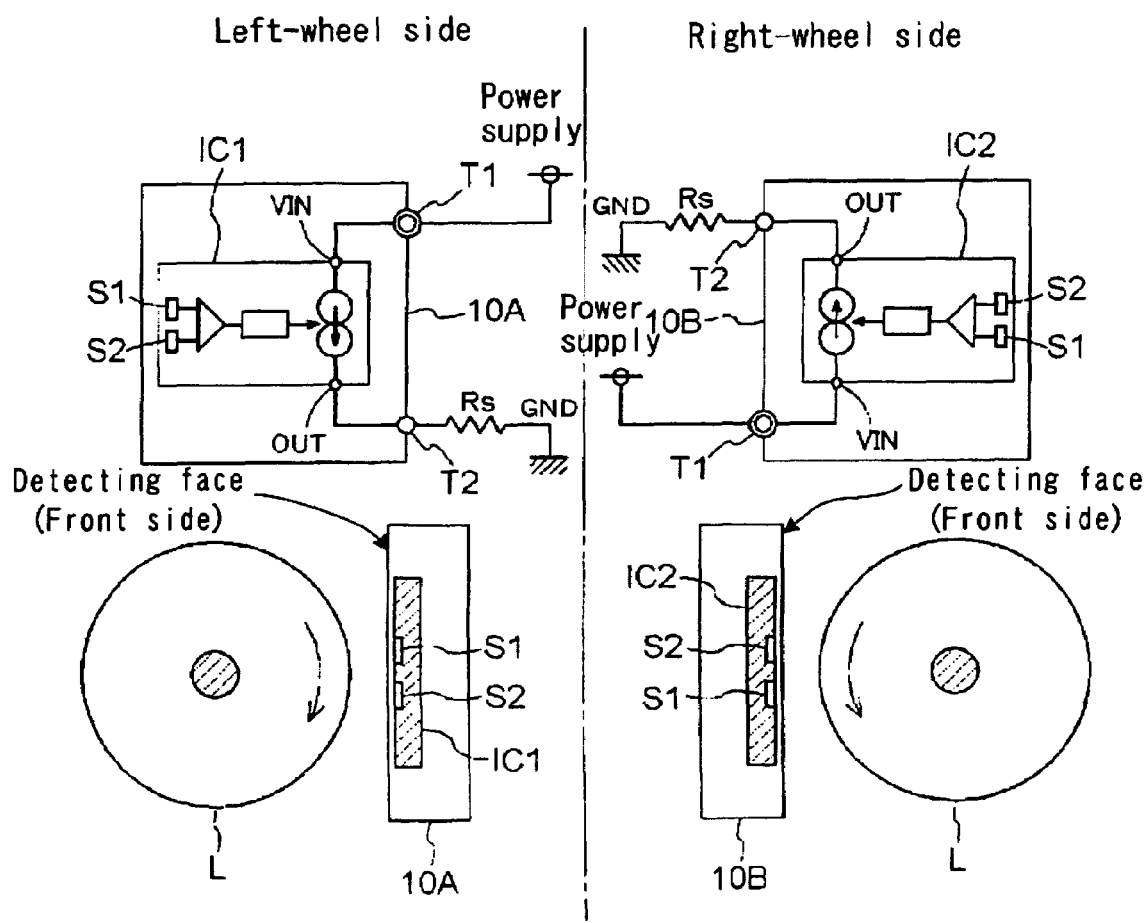

TWO-WIRE TYPE CURRENT OUTPUT SENSOR AND IC THEREFOR

CROSS REFERENCE TO RELATED APPLICATIONS

This application is based on and claims priority under 35 U.S.C. § 119 to Japanese Patent Application 2003-371827, filed on Oct. 31, 2003, the entire content of which is incorporated herein by reference.

FIELD OF THE INVENTION

This invention generally relates to a two-wire type current output sensor and IC therefor.

BACKGROUND

A known two-wire type current output sensor is disclosed in JP10(1998)-332725A. The disclosed sensor includes two external connection terminals. One of the external connection terminals is defined as a power supply terminal to which the power supply current flows from the outside, and the other one of the external connection terminals is defined as a GND terminal (output terminal) from which the power supply current flows to the outside. In addition, the current flowing from the GND terminal (i.e. current level) is changed in accordance with a detection signal of a detecting element to be an output signal. Therefore, only two wires connected to the power supply terminal and the GND terminal are required for a supply line to the disclosed two-wire type current output sensor.

The aforementioned two-wire type current output sensor is mainly used as a rotation sensor for ABS, AT, and the like in the vehicle. The direction of flow of the current is decided at respective (i.e. two) external connection terminals. That is, as shown in FIG. 7, for example, two external connection terminals T1 and T2 are provided on a sensor body 10 on which a rotation detecting IC (current output IC) storing a magnetic detecting element S (Hall element) and a signal processing circuit 100 is mounted. Then, one terminal T1 is determined as the power supply terminal and connected to a power supply side terminal VIN of the rotation detecting IC while the other terminal T2 is determined as the GND terminal and connected to the current output side terminal OUT of the rotation detecting IC. Rs is a detection resistance provided at the outside.

Further, the aforementioned two-wire type current output sensor includes two magnetic detecting elements for outputting respective rotation detection signals having different phase relations from each other in accordance with a rotation direction of a rotating member (detected member) so that the rotation direction of the rotating member in addition to the rotation speed can be recognized. Then, the signal processing circuit changes the protocol of the current output signal in accordance with the change of the rotation direction of the rotating member (for example, the current wave is changed in accordance with the rotation direction).

According to the aforementioned current output sensor, the detecting element face (i.e. face of the sensor that can detect the detected member via the detecting element) is provided on a predetermined side of the sensor. In addition, two external connection terminals T1 and T2 are determined as the power supply terminal and the GND terminal respectively. Thus, the mounting arrangement of the signal processing circuit 100 (precisely, the rotation detecting IC and the like) is restricted such that the power supply side VIN of the rotation detecting IC is arranged close to the power supply terminal T1 while the current output side OUTS of the rotation detecting IC is arranged close to the GND terminal T2 as shown in FIG. 7. At this time, if the power supply terminal and the GND terminal are switchable when designated for the respective two external connection terminals, i.e. the power supply terminal T1 may be determined as the power supply terminal while the power supply terminal T2 may be determined as the GND terminal, or the power supply terminal T1 may be determined as the GND terminal while the power supply terminal T2 may be determined as the power supply terminal regardless of the mounting position of the signal processing circuit 100 (precisely, the rotation detecting IC) on the sensor, the designing flexibility of the harness for supplying power to the sensor and the like may be increased.

Further, a left-wheel rotation sensor and a right-wheel rotation sensor for ABS, for example, having a function of detecting a rotation direction include sensor bodies 10A and 10B respectively being symmetrical each other. In addition, respective harnesses for power supply with respective connectors CNs having the equal terminal arrangement to each other are used for the left-wheel rotation sensor and the right wheel rotation sensor. The sensors should be configured such that respective rotation base directions for the right-wheel rotation sensor and the left-wheel rotation sensor are different from each other.

That is, since the detecting element face of the rotation detecting IC is determined to be positioned on one face (front side) of a package of the IC, a rotation detecting IC 1 for the left wheel and a rotation detecting IC 2 for the right wheel should be mounted on the sensor bodies 10A and 10B respectively such that the ICs 1 and 2 are symmetrical each other to thereby bring each detecting face (front side) faces a rotor L. As a result, in the left-wheel sensor, a protocol 1 is output in the rotation direction in which a magnetic pole of the rotor L is detected in order by detecting elements 1 and 2 while a protocol 2 is output in the reverse rotation direction. At the same time, in the right-wheel sensor, the protocol 1 is output in the rotation direction in which the magnetic pole of the rotor L is detected in order by the detecting elements 2 and 1 while the protocol 2 is output in the reverse rotation direction. Accordingly, two types of signal processing circuits or signal processing ICs are required so that the rotation base directions for the left-wheel sensor and the right-wheel sensor are different from each other, which may cause a cost increase.

Thus, a need exists for a two-wire type current output sensor and IC therefor whose two external connection terminals can be switchable between a power supply terminal and a GND terminal.

In addition, a need exists for the two-wire type current output sensor and IC therefor that can reduce a mounting restriction by using an IC package storing a detecting element without decreasing the detection performance.

Further, a need exists for the two-wire type current output sensor and IC therefor that can employ a single type of rotation detecting IC with a function of detecting a rotation direction of a detected member for rotation sensors having symmetrical sensor bodies each other.

SUMMARY OF THE INVENTION

According to an aspect of the present invention, a two-wire type current output sensor includes two external connection terminals to one of which a power supply flows from an outside and from the other one of which the power supply flows to the outside, a detecting element provided so as to face a detected member and capable of outputting a detection signal, a signal processing circuit for changing a current supplied to a power supply side of the signal processing circuit based on the detection signal of the detecting element and outputting the changed current, and a connection switching circuit for switching a connection between the two external connection terminals and the signal processing circuit such that one of the external connection terminals at a higher voltage is connected to the power supply side of the signal processing circuit while the other one of the external connection terminals at a lower voltage is connected to an output side of the signal processing circuit.

According to another aspect of the present invention, a two-wire type current output circuit and IC therefor includes two external connection terminals to one of which a power supply flows from an outside and from the other one of which the power supply flows to the outside, a detecting element provided so as to face a detected member and capable of outputting a detection signal, and a signal processing circuit for changing a current supplied to a power supply side of the signal processing circuit based on the detection signal of the detecting element and outputting the changed current. The detecting element is stored in an IC package including two detecting faces facing each other.

BRIEF DESCRIPTION OF THE DRAWINGS

The foregoing and additional features and characteristics of the present invention will become more apparent from the following detailed description considered with reference to the accompanying drawings, wherein:

FIG. 7 is a block diagram showing a configuration of a conventional two-wire type current output sensor;

FIG. 8 is a view showing a using status of the conventional two-wire type current output sensor.

DETAILED DESCRIPTION

Figure 1:
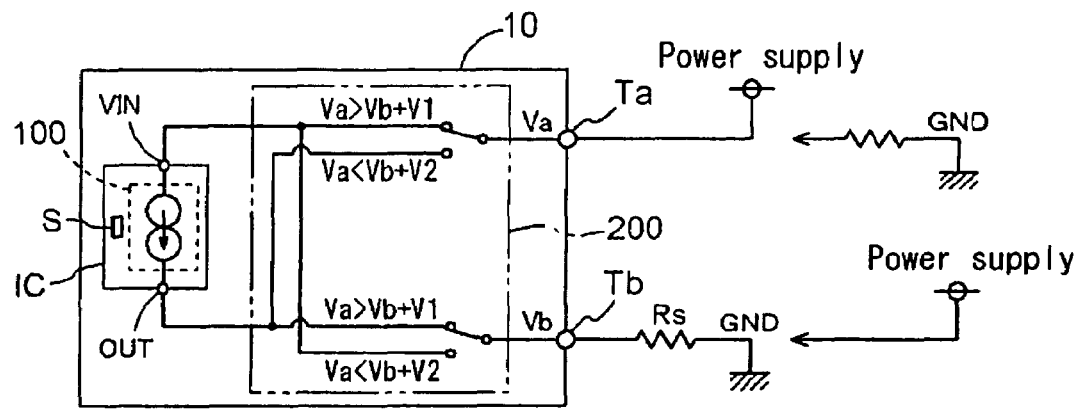
FIG. 1 is a block diagram showing a basic configuration of a two-wire type current output sensor according to an embodiment of the present invention.

An embodiment of the present invention is explained referring to attached drawings. As shown in FIG. 1, a two-wire type current output sensor according to the present embodiment includes two external connection terminals Ta and Tb to one of which the power supply current flows from the outside and from the other one of which the power supply current flows to the outside, a detecting element S provided, facing a detected member for outputting a detection signal, and a signal processing circuit 100 for changing the current supplied to a power supply side of the signal processing circuit 100 based on the detection signal of the detecting element S and outputting that changed current. The two-wire type current output sensor also includes a connection switching circuit 200 for switching the connection between the two external connection terminals Ta and Tb, and the signal processing circuit 100 so that one of the external connection terminals Ta and Tb at a higher voltage is connected to a power supply side VIN of the signal processing circuit 100 while the other one of the external connection terminals Ta and Tb at a lower voltage is connected to an output side OUT of the signal processing circuit 100.

In FIG. 1, a known rotation detecting IC storing the detecting element S such as a Hall element, and the signal processing circuit 100 is mounted on a sensor body 10 equipped with the external connection terminals Ta and Tb at end portions. In this case, a power supply terminal VIN of the rotation detecting IC corresponds to the power supply side VIN of the signal processing circuit 100 while a current output terminal OUT of the rotation detecting IC corresponds to the output side OUT of the signal processing circuit 100. In addition, a rotating member such as a rotor (not shown) is defined as the detected member in FIG. 1.

The connection switching circuit 200 connects the external connection terminal Ta with the power supply terminal VIN of the rotation detecting IC (i.e. the power supply side VIN of the signal processing circuit 100), and also connects the external connection terminal Tb with the current output terminal OUT of the rotation detecting IC (i.e. the output side OUT of the signal processing circuit 100) in case that a voltage Va of the external connection terminal Ta and a voltage Tb of the external connection terminal Tb are compared with each other and then Va>Vb+V1 is obtained. On the contrary, the connection switching circuit 200 connects the external connection terminal Ta with the current output terminal OUT of the rotation detecting IC (i.e. the output side OUT of the signal processing circuit 100) and also connects the external connection terminal Tb with the power supply terminal VIN of the rotation detecting IC (i.e. the power supply side VIN of the signal processing circuit 100) when Va<Vb+V2 is obtained. At this time, the aforementioned V1 and V2 are threshold values defined for stably performing the switching operation by the connection switching circuit 200.

Figure 2:
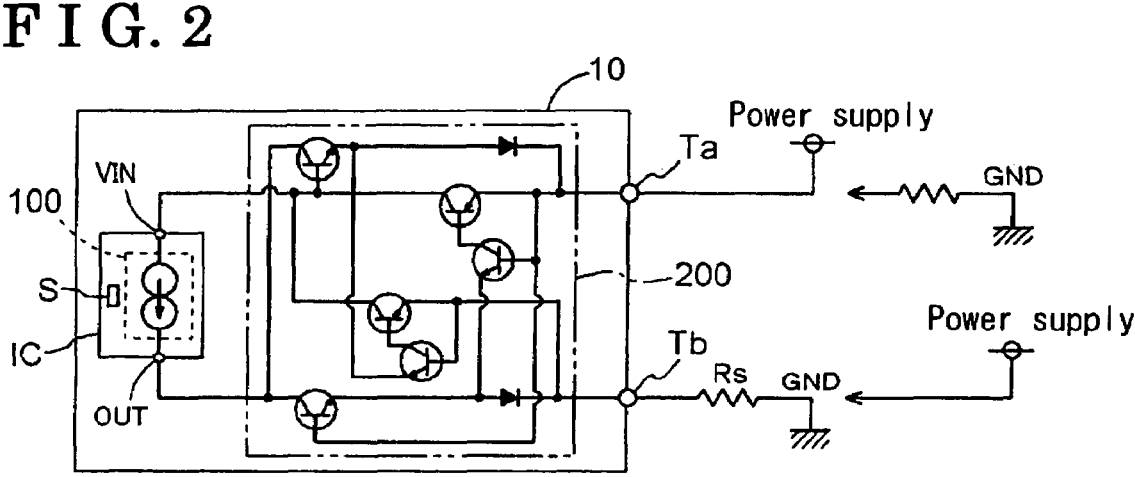
FIG. 2 is a block diagram showing a detailed configuration of the two-wire type current output sensor according to the embodiment of the present invention.

FIG. 2 shows a detailed example of the connection switching circuit 200 in FIG. 1. The connection switching circuit 200 is constituted by a simple switching circuit by using a transistor, diode, and the like. Accordingly, in case that an external power supply is connected to the external connection terminal Ta and at the same time a current output circuit on GND side is connected to the external connection terminal Tb, or, inversely, the current output circuit on GND side is connected to the external connection terminal Ta and at the same time the external power supply is connected to the external connection terminal Tb, the signal processing circuit 100 is properly powered within the two-wire type current output sensor. The connection switching is performed with assuring the normal sensor function.

Figure 3:
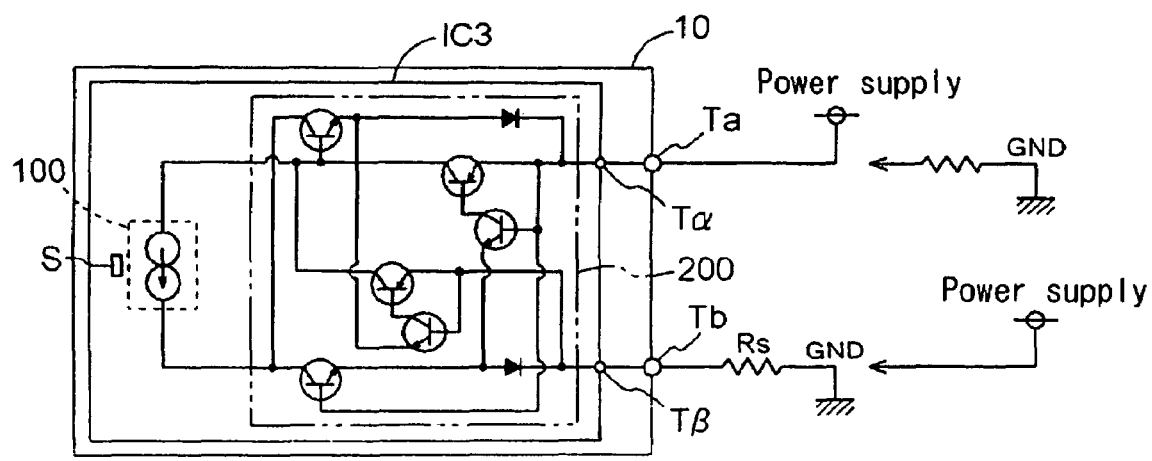
FIG. 3 is a block diagram showing a detailed configuration of the two-wire type current output sensor according to the embodiment of the present invention.

FIG. 3 shows an example of the two-wire type current output sensor storing the detecting element S, the signal processing circuit 100 and the connection switching circuit 200. In addition, a different type of IC 3 having two external signal terminals Tα and Tβ on a power supply side and an output side relative to the connection switching circuit 200 is mounted on the two-wire type current output sensor. That is, the switching circuit constituted by external parts such as transistor and diode is provided as an internal circuit of the IC3.

Figure 4A:
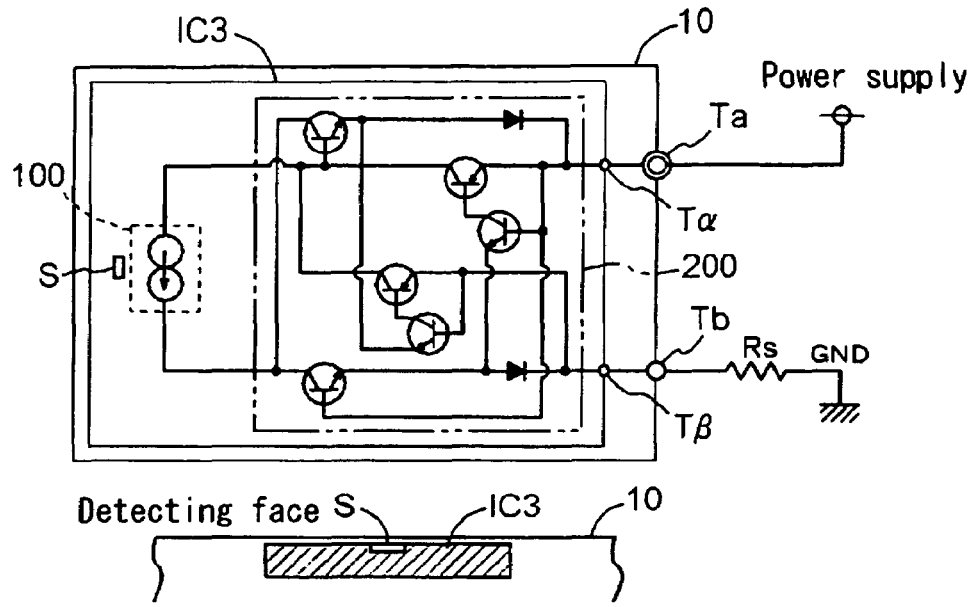
FIG. 4A is a view showing a using status of the two-wire type current output sensor of FIG. 3.
Figure 4B:
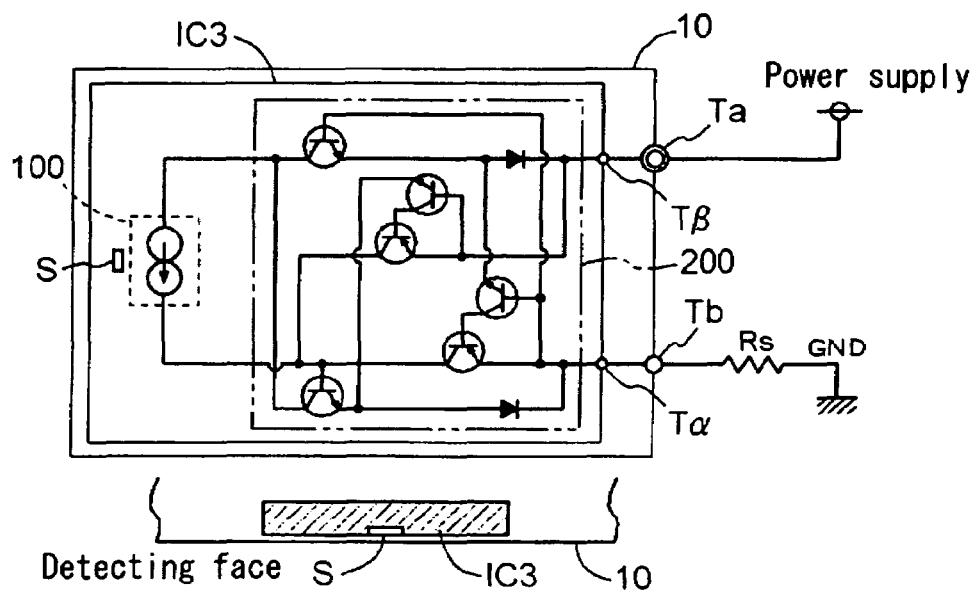
FIG. 4B is a view showing a using status of the two-wire type current output sensor of FIG. 3.

The restriction of mounting arrangement may be greatly eased by employing the IC3 storing the connection switching circuit 200 as in the following explanation referring to FIG. 4. Based on the mounting arrangement in FIG. 4A, the IC3 is then mounted so as to be upside down as shown in FIG. 4B without changing the connection status of the external power supply and GND relative to the two external connection terminals Ta and Tb. The two external signal terminals Tα and Tβ of the IC3 may be connected with the two external connection terminals Ta and Tb via a shortest route. Since the detecting face is provided on a predetermined side, i.e. only one side, of the detecting element S in the IC 3, when the detecting face is provided on the front side in FIG. 4A, for example, then the IC3 should be arranged such that the detecting face is positioned on a back side in FIG. 4B.

Figure 5:
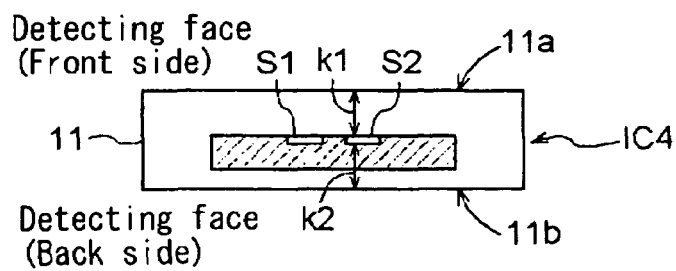
FIG. 5 is a cross-sectional view of a configuration of another two-wire type current output sensor.

A further different type of IC4 storing the detecting element S, the signal processing circuit 100 and the connection switching circuit 200 is explained as follows. As shown in FIG. 5, the detecting element S (precisely, detecting elements S1 and S2 to be mentioned later) is stored in an IC package 11. At the same time, the IC package 11 includes two detecting faces 11a and 11b facing the detecting element S with keeping respective distances k1 and k2. The distances k1 and k2 are equal to each other. According to the present embodiment, at least the detecting element S is desirably stored and mounted in the IC package having two detecting faces 11a and 11b.

As shown in FIG. 5, the detecting element S is not a single element and constituted by two detecting elements S1 and S2 for outputting respective rotation detecting signals having different phase relations from each other in accordance with a rotation direction of the rotation member (rotor L) as the detected member. That is, the detecting element S can be constituted by two or more of the detecting elements outputting the respective rotation detecting signals having different phase relations from each other in accordance with the rotation direction of the rotation member (rotor L). In addition, the signal processing circuit 100 is constituted so as to change the output current in accordance with the rotation speed signal of the rotation member (rotor L) under the condition that the rotation direction of the rotation member can be identified (see FIG. 6).

Figure 6:
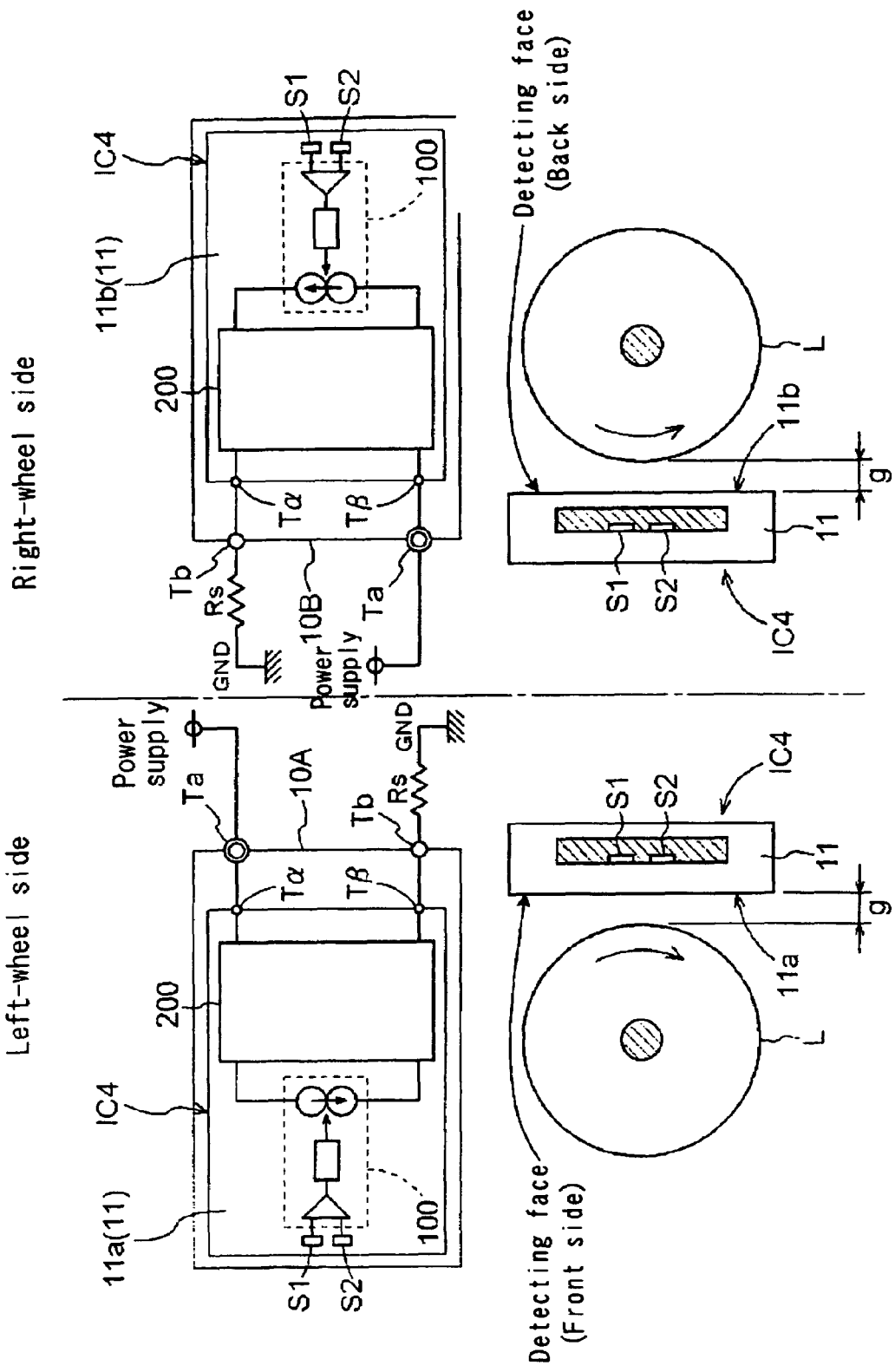
FIG. 6 is a view showing a using status of the two-wire type current output sensor of FIG. 5.
Figure 9:
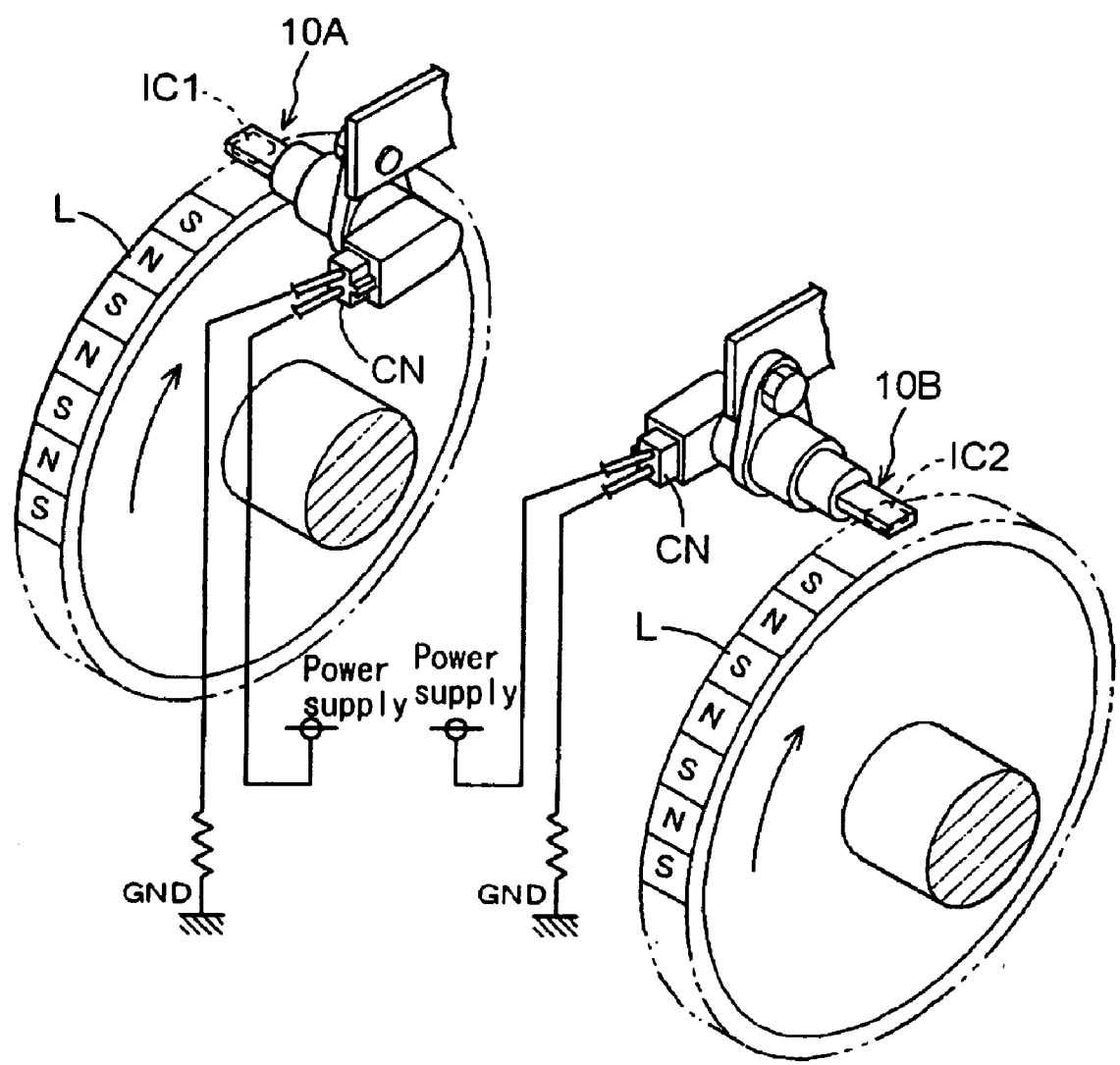
FIG. 9 is a perspective view showing a state in which the two-wire current output sensor is applied for detecting each rotation of left and right wheels.

FIG. 6 shows an example of employing the IC4 for detecting the rotation of right and left wheels for ABS and the like (see FIG. 9). The IC4 is mounted on a sensor body 10A for the left wheel such that one detecting face 11a (front side) of the package 11 is arranged, facing the rotor L of the left wheel with keeping a detection gap g therebetween. Then, when the rotor L of the left wheel rotates in the normal direction as shown in FIG. 6, the rotor L is detected in order by the detecting elements S1 and then S2. At the same time, the IC4 is mounted on a sensor body 10B for a right wheel such that the other detecting face 11b (back side) of the package 11 is arranged, facing the rotor L of the right wheel with keeping the same detection gap g therebetween as that for the left-wheel side. Then, when the rotor L of the right wheel rotates in the normal direction, the rotor L is detected in order by the detecting elements S1 and then S2. That is, a base rotation direction is same in the respective rotation sensors for the left and right wheels and thus the IC4 with a single type of protocol may be utilized.

According to the aforementioned embodiment, the detected member is the rotation member (rotor L). However, the detected member is not limited to the rotation member and various kinds of objects may be employed.

In addition, not only the magnetic detecting element such as the Hall element but also various kinds of detecting elements may be employed for the detecting elements S, S1 and S2.

Further, according to the aforementioned embodiment, even when one of the external connection terminals Ta and Tb is determined as the power supply terminal while the other one of the external connection terminals Ta and Tb is determined as the GND terminal due to the connection that the power supply side VIN and the output side OUT of the signal processing circuit 100 are connected to two external connection terminals Ta and Tb via the connection switching circuit 200, the power supply current is supplied from the outside to the power supply side VIN of the signal processing circuit 100 via one of the external connection terminals Ta and Tb at a higher voltage (i.e. power supply terminal) while the output current in accordance with the detection signal of the detecting element S is output from the output side OUT of the signal processing circuit 100 to the outside via the other one of the external connection terminals Ta and Tb at a lower voltage (i.e. GND terminal).

As a result, two external connection terminals Ta and Tb are each switchable between the power supply terminal and the GND terminal. In addition, if the electrode arrangement (i.e. power supply and GND) of the connecter and the like connected to two external connection terminals Ta and Tb is in a reverse connection state by failure, a fail-sensor function is activated due to a specific system that triggers a normal operation, thereby assuring a proper sensor function.

Furthermore, according to the aforementioned embodiment, the IC 3 further stores the connection switching circuit 200 in addition to the detecting element S and the signal processing circuit 100. At the same time, two external signal terminals Tα and Tβ on the power supply side and the output side of the IC 3 relative to the connection switching circuit 200 are connected to the two external connection terminals Ta and Tb of the sensor body 10 respectively. Thus, the power supply terminal and the GND terminal may be switched therebetween by the connection switching circuit 200 in the IC 3 in accordance with the voltage level of the two external connection terminals of the sensor body 10. In this case, the IC 3 may be mounted on the sensor body 10 with less restriction when the two external signal terminals Tα and Tβ of the IC 3 are connected to the two external connection terminals Ta and Tb of the sensor body 10 respectively.

As a result, the restriction of mounting the IC 3 on the sensor body 10 may be further eased while the two external connection terminals of the sensor body 10 can be switched between the power supply terminal and the GND terminal.

Furthermore, according to the aforementioned embodiment, in case that the IC package 11 storing the detecting element S is mounted on the sensor body 10 such that any one of two detecting faces on the IC package 11, being positioned at equal distances from the detecting element S to each other, faces the detecting element S, the distances between the respective detecting faces and the detected member are equal to each other and thus the same detecting sensitivity may be obtained by the respective detecting faces.

Therefore, the mounting restriction may be eased by using the IC package storing the detecting element S such as the Hall IC, MR (magnetic resistance), IC and the like with assuring the same detection sensitivity.

Furthermore, according to the aforementioned embodiment, in case that the rotation sensors having symmetrical sensor bodies each other and the rotation direction detecting function are employed, the identical base rotation direction is achieved in each rotation sensor even when a single type of the rotation detecting IC storing two or more of the detecting elements is mounted on each of the symmetrical sensor bodies by turning over the rotation detecting IC, i.e. the front side and the back side thereof. Two types of rotation detecting IC with the different base rotation directions from each other are not required accordingly.

Therefore, a single type of rotation detecting IC may be used in the sensor with the symmetrical sensor bodies, thereby avoiding a cost increase.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A two-wire type current output sensor comprising:
   two external connection terminals to one of which a power supply flows from an outside and from the other one of which the power supply flows to the outside;
   a detecting element provided so as to face a detected member and capable of outputting a detection signal;
   a signal processing circuit for changing a current supplied to a power supply side of the signal processing circuit based on the detection signal of the detecting element and outputting the changed current; and
   a connection switching circuit for switching a connection between the two external connection terminals and the signal processing circuit such that one of the external connection terminals at a higher voltage is connected to the power supply side of the signal processing circuit while the other one of the external connection terminals at a lower voltage is connected to an output side of the signal processing circuit.

2. A two-wire type current output sensor according to claim 1, further comprising an IC storing the detecting element, the signal processing circuit and the connection switching circuit and including two external signal terminals on a power supply side and an output side relative to the connection switching circuit.

3. A two-wire type current output sensor according to claim 1, wherein the detecting element includes at least two detecting elements for outputting respective rotation detection signals having different phase relations from each other in accordance with a rotation direction of a rotating member as the detected member, and the signal processing circuit changes an output current in response to a rotation speed signal of the rotating member so that a rotation direction of the rotating member can be identified.

4. A two-wire type current output sensor according to claim 1,
   wherein the detecting element is stored in an IC package including two detecting faces facing each other.

5. A two-wire type current output sensor according to claim 4, wherein the detecting element includes at least two detecting elements for outputting respective rotation detection signals having different phase relations from each other in accordance with a rotation direction of a rotating member as the detected member, and the signal processing circuit changes an output current in response to a rotation speed signal of the rotating member so that a rotation direction of the rotating member can be identified.

6. A two-wire type current output sensor according to claim 4, wherein the two detecting faces of the IC package are positioned at equal distances from respective sides of the detecting element.

7. A two-wire type current output sensor according to claim 4, wherein the detecting element stored in the IC package outputs respective rotation detection signals having different phase relations from each other in accordance with a movement of the detected member.

8. A two-wire type current output sensor according to claim 4, wherein the detecting element is applied as an element for a rotation detection to a vehicle antilock braking system.

9. A two-wire type current output sensor according to claim 8, wherein the detecting element applied to the vehicle antilock braking system includes a first detecting element and a second detecting element, and each rotation of a right-wheel and a left-wheel is detected by the first detecting element and the second detecting element in order thereof.

10. A two-wire type current output sensor according to claim 1, wherein one of the external connection terminals at a lower voltage out of two external connection terminals is connected to a ground via the signal processing circuit.

* * * * *